(12) United States Patent
Stanley

(10) Patent No.: US 7,004,705 B1
(45) Date of Patent: Feb. 28, 2006

(54) DOLLY FOR TRANSPORTING PREFAB HOMES AND THE LIKE

(76) Inventor: Jerry W. Stanley, 16273 Spring Valley Rd., Abingdon, VA (US) 24210

( * ) Notice: Subject to any disclaimer, the term of this patent is extended or adjusted under 35 U.S.C. 154(b) by 0 days.

(21) Appl. No.: 10/831,984

(22) Filed: Apr. 26, 2004

Related U.S. Application Data

(63) Continuation-in-part of application No. 10/241,267, filed on Sep. 12, 2002, now abandoned.

(51) Int. Cl.
*E04G 21/14* (2006.01)

(52) U.S. Cl. .......................... 414/10; 414/12
(58) Field of Classification Search ................. 414/10, 414/12; 280/91.1, 149.1, 656
See application file for complete search history.

(56) References Cited

U.S. PATENT DOCUMENTS

| | | | | |
|---|---|---|---|---|
| 2,472,932 A | * | 6/1949 | Adkins ........................ | 414/12 |
| 5,655,733 A | * | 8/1997 | Roach ......................... | 414/458 |
| 6,129,495 A | * | 10/2000 | Marshall ....................... | 414/12 |
| 6,612,601 B1 | * | 9/2003 | Granlind .................. | 280/414.1 |
| 6,846,144 B1 | * | 1/2005 | Justice ........................ | 414/12 |

\* cited by examiner

*Primary Examiner*—Douglas Hess

(57) ABSTRACT

A wheeled dolly for transporting prefab homes or the like and having at least two outboard wheel means spaced apart a distance for normal road travel, and further having at least two inboard wheel means on opposite lateral sides of a longitudinal axis of the dolly whereby when a narrow roadway is encountered the operator can position the inboard wheel means thereon such that either or both of the outboard wheel means may actually be suspended off the sides of the roadway until the roadway regains a normal width, and wherein a steering mechanism is provided to synchronously pivot all said wheel means thru a steering angle whereby the dolly and load can be steered straight ahead or in sideways angular directions to avoid obstacles and to allow maneuvering of a long load around corners which are too sharp for conventional transport means.

10 Claims, 4 Drawing Sheets

DOLLY FOR TRANSPORTING PREFAB HOMES AND THE LIKE

BACKGROUND OF THE INVENTION

This application is a continuation-in-part of Applicant's Ser. No. 10/241,267 now abn filed Sep. 12, 2002 of same title.

FIELD

This invention concerns a unique dolly construction for carrying large, heavy and cumbersome structures such as prefab homes, or the like over difficult roadways, particularly where the roadway changes in width, e.g., from about 12 ft. or more to about 7 ft. or less.

PRIOR ART

Heretofore, prefab home structures such as a half of a double wide prefab home, or a manufactured small mountain log cabin or the like generally have been mounted on wheel assemblies such as the common two wheel tandems or double or triple axle wheel units, or on specially built carriages such as that shown, e.g., in U.S. Pat. Nos. 2,896,909; 5,012,879; and 6,129,495, the disclosures of which are hereby incorporated herein by reference in their entireties. The home structures are then secured to the wheel assembly or carriage for transportation to the lot site where, e.g., each half, in turn, is to be placed on a more permanent foundation. In such wheel assemblies, typically, the distance between the wheels is at least about 8 ft.

The transportation of such structures which can weigh up to 20 tons or so, is often made impossible where the roadway narrows down, especially such as over narrow country bridges or roads which often are only about seven or eight feet in width and can barely be negotiated by automobiles.

SUMMARY OF THE INVENTION

In brief summary, the invention comprises a wheeled dolly having a longitudinal axis and being of heavy, strong steel construction, wherein a plurality of axle means are provided on the dolly, at least two outboard wheel means and at least two inboard wheel means are mounted on said axle means, whereby when a narrow roadway is encountered the operator can position the inboard wheel means thereon such that either or both of the outboard wheel means may actually be suspended off the sides of the roadway until the roadway regains a normal width, of, for example 12 ft. or more, and wherein a steering mechanism is provided to synchronously pivot all said wheel means thru a steering angle whereby the dolly and load can be steered straight ahead or in sideways angular directions to avoid obstacles and to allow maneuvering of a long load around corners which are too sharp for conventional transport means.

BRIEF DESCRIPTION OF THE DRAWINGS

The invention will be further understood from the following description and drawings wherein the depictions are not to scale and wherein certain structural portions are enlarged out of proportion or broken away or sectioned for clarity, and wherein.

DETAILED DESCRIPTION

Figure 5:
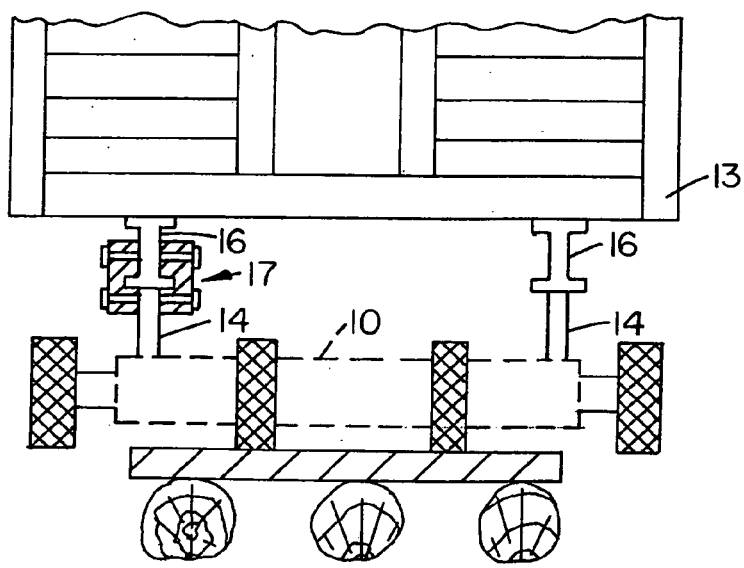
FIG. 5 is a rear view of a loaded dolly travelling on a narrow bridge.
Figure 6:
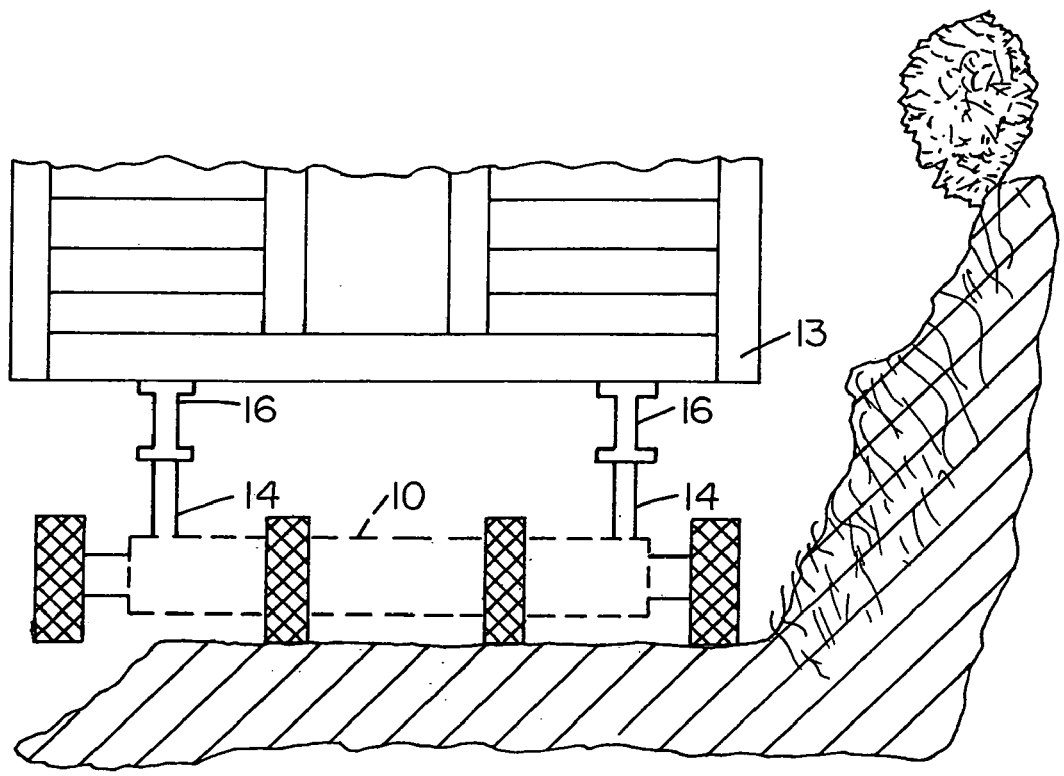
FIG. 6 is a rear view as in FIG. 5 of the dolly travelling over a narrow country road.

With reference to the claims and drawings, the present dolly comprises base or frame means generally designated 10 having a longitudinal axis 12 and being of heavy, strong steel construction capable of carrying 5 to 30 or more tons of load 13 and transporting the same over difficult roadways. Laterally spaced girder means 14, preferably about six or more feet in length, are provided on the dolly and are adapted to be connected to laterally spaced longitudinal supporting beam means 16 of the load. The equivalent of 14 and 16 are shown as 42, 44, 46 and 48 in the aforementioned U.S. Pat. No. 6,129,495. Also shown in this patent are several devices for attaching the load to girders 14, which devices can also be used with the present dolly. In this regard a bolt attachment device is shown in FIG. 5 as item 17. It is noted that the beam means of the load can run longitudinally, angularly or laterally, or any combination thereof, depending on the construction of the load.

Figure 2:
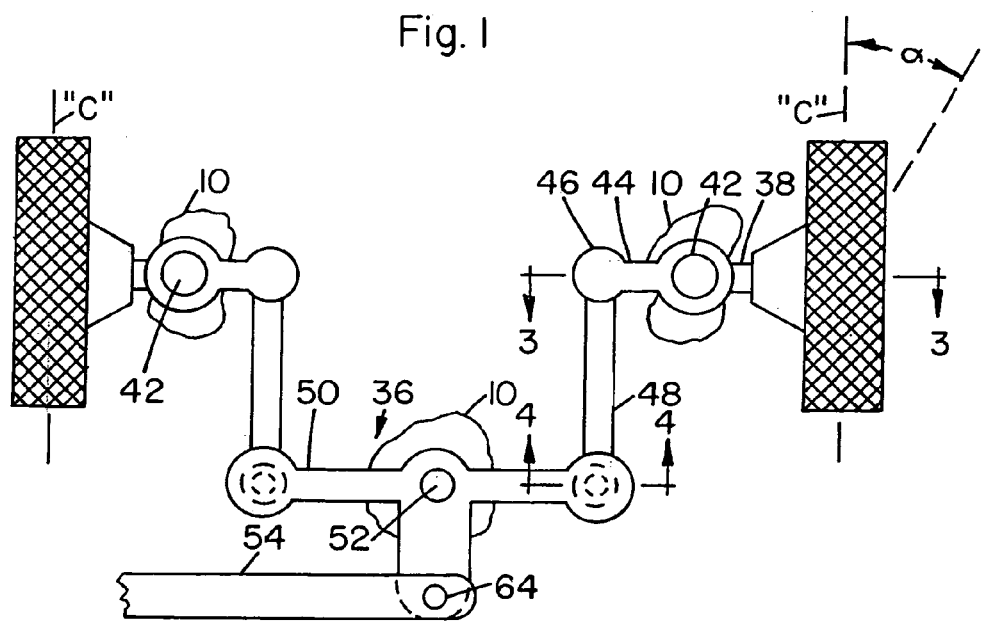
FIG. 2 is an enlarged view of one of the axle and wheel means with a tandem steering linkage affixed.
Figure 3:
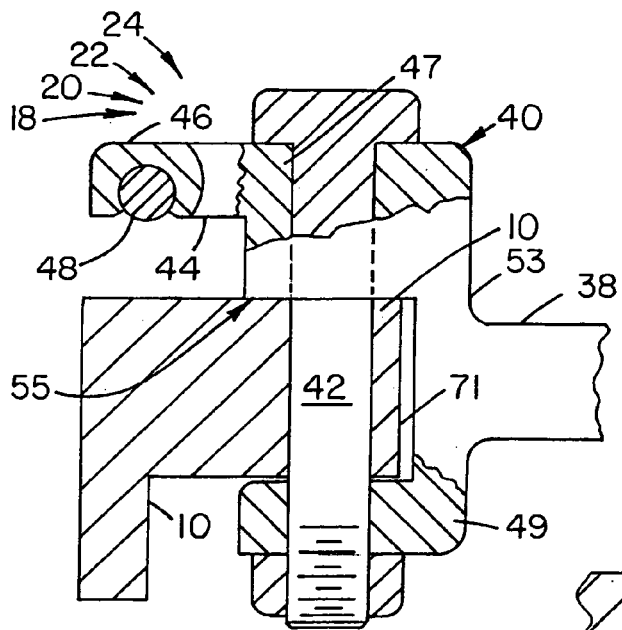
FIG. 3 is a partially cross-sectioned view of a wheel mounting structure taken along line 3—3 of FIG. 2 in the direction of the arrows.

A plurality of axle means 51 such as axle pair 18 and 20 and pair 22 and 24 are provided on the dolly, preferably on a common lateral axis 26 normal to said longitudinal axis 12 and said pairs lying on opposite lateral sides of axis 12. Outboard wheel means 28,30 are mounted on the outboard axle means 18,24 and are spaced from each other a distance preferably of at least about eight feet as measured from the centerlines "c" of the wheels. Inboard wheel means 32,34 are mounted on the inboard axle means 20, 22, each said wheel means being laterally spaced from said longitudinal axis a distance preferably of at least about one foot also as measured from the centerline "c" of the wheels. A preferred steering mechanism generally designated 36 is provided to synchronously pivot all said wheel means thru a steering angle such as "α" in FIG. 2.

It is noted that any number of axle means and wheels may be used on the present dolly, and any number of dollies may be employed, e.g., two or three for extra long loads, however, for transport of typical moderate size manufactured homes, the arrangement as shown in the drawings is highly preferred.

The preferred axle means structure shown in the drawings for mounting the wheels comprises an axle shaft 38 on which a bearinged wheel is rotatably mounted. Each axle 38 is integral with a steering knuckle 40 which is pivotally mounted, e.g., on a preferred segment 71 of frame 10 by a pin 42. The knuckle 40 preferably comprises bearing arms 47 and 49 integral with a body section 53.

Figure 1:
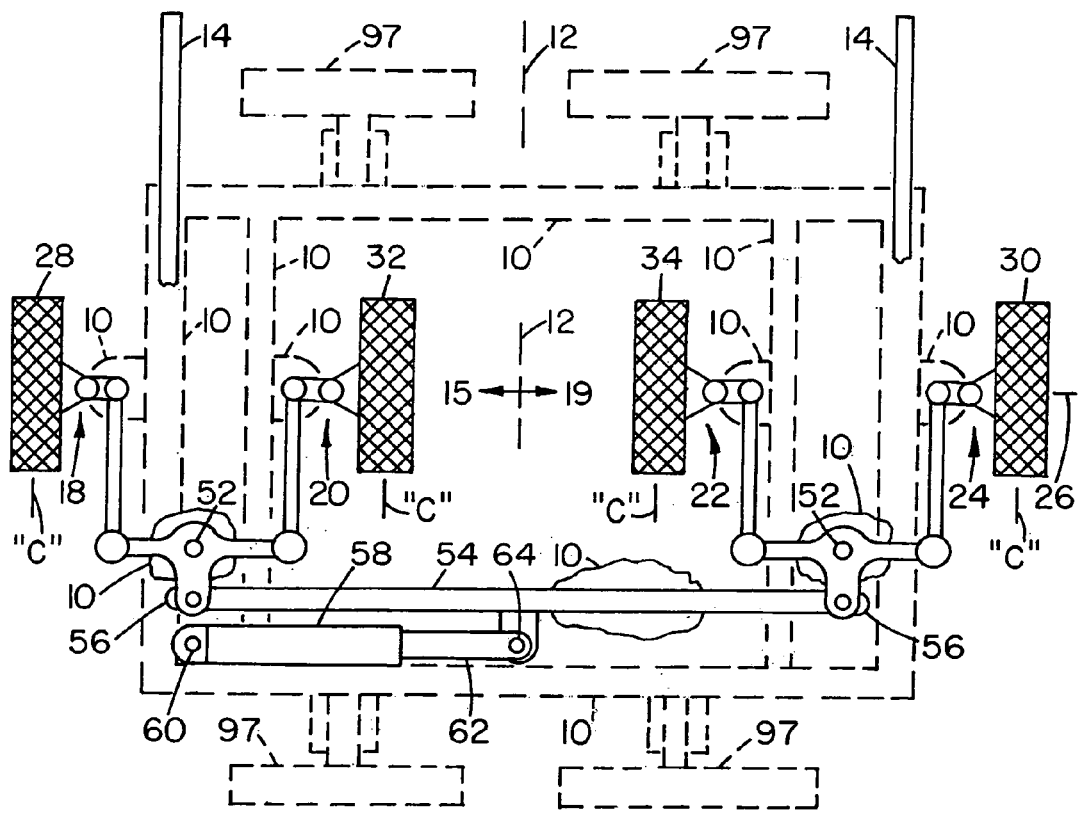
FIG. 1 is a top down plan view of the present dolly structure with frame portions and auxiliary wheels (for bringing the dolly to the manufactured home to be transported) shown by dotted line and general area lines.
Figure 4:
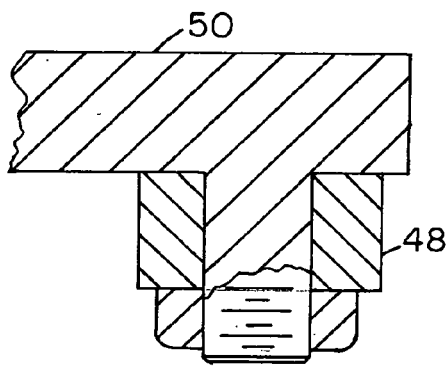
FIG. 4 is a cross-sectional view taken along line 4—4 of FIG. 2 in the direction of the arrows.

One preferred steering mechanism generally designated 36 comprises a steering arm 44 connected by a ball joint or the like 46 to an arm 48 which is pivotally connected as shown in FIG. 4 to a T member 50 pivotally mounted on frame 10 by pin 52. As shown in FIG. 1 a tie rod 54 is pivotally connected by pins 56 to the T members 50. A cylinder 58 which is manually or electrically operated air or hydraulic, e.g., double acting hydraulic, is pivotally mounted on frame 10 by pin 60 and its piston rod 62 is pivotally connected by pin 64 to tie rod 54. In operation, actuation of 58 will steer all wheels synchronously in the same direction thru the same angle "α".

Figure 7:
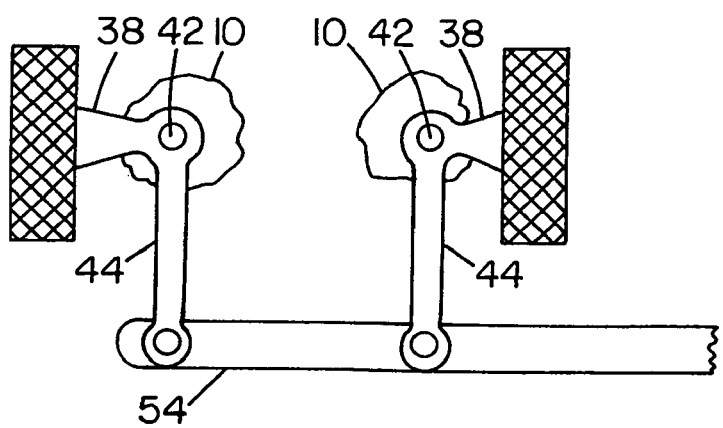
FIG. 7 is a top view of a portion of a four-wheel tandem steering mechanism.
Figure 8:
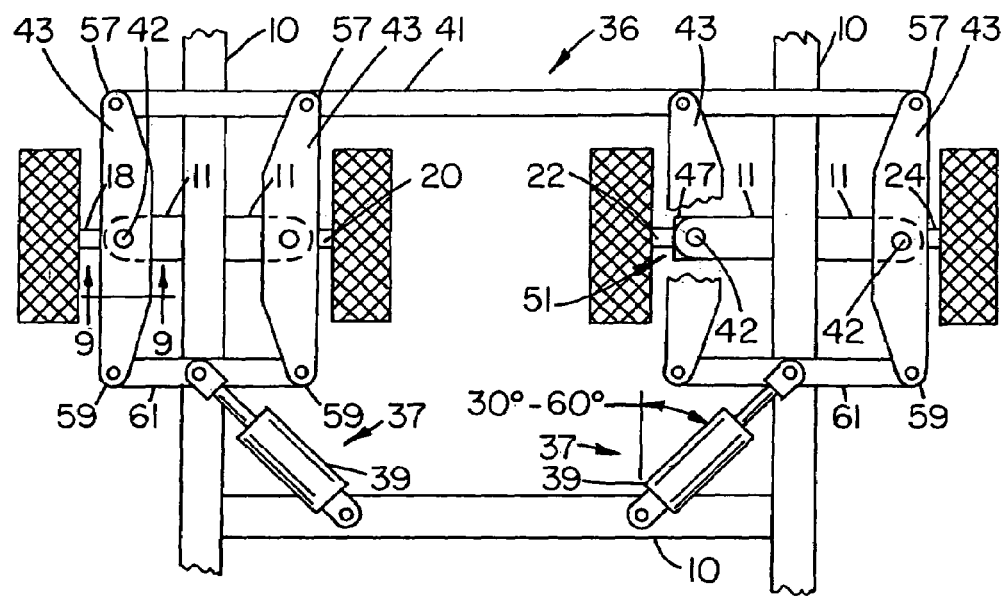
FIG. 8 is a top down view of a most preferred steering mechanism.
Figure 9:
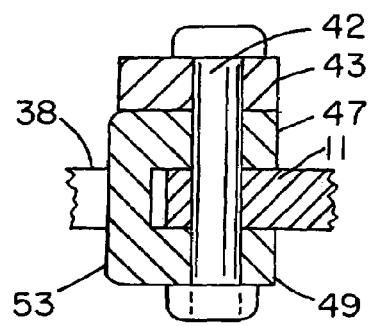
FIG. 9 is a cross-sectional view taken along line 9—9 in FIG. 8 in the direction of the arrows.

As shown in FIG. 7, the steering means is simplified in that the steering arms 44 are integral with the axles 38 and tie rod 54 is pivotally connected to each individual steering arm 44 such that a T member 50 is eliminated. In place of rod 54 a rack and pinion type of power likeage, and also electrical motor steering power means may be employed.

A most preferred steering mechanism 36 which represents the best mode of the present invention known to Applicant at this time, comprises a pivot arm means 43 affixed to each knuckle 40 and extending generally longitudinally and having a tie rod end 57 and a power end 59. A power bar means 61 pivotally connects the power ends 59 of adjacent pivot arm means 43 and power means generally designated 37 is pivotally connected between said bar means 61 and said base means 10 and is adapted to pivot, in tandem, the wheels of said pairs. A gang tie rod means 41 is pivotally connected to each tie rod end 57 of each pivot arm means 43 whereby the wheel pivot structure for all wheels is high stabilized.

The power means comprises a hydraulic cylinder 39 pivotally affixed to and between each said power bar means 61 and said base means 10. Preferably, the cylinders (and rods) are angled laterally outwardly from longitudinal axis 12 at an angle of from about 30° to about 60° to axis 12. Also preferred are for the gang tie rod means 41 and the cylinders 39 to be mounted on opposite sides of lateral axis 26.

With reference to the claims, a preferred embodiment of the present invention comprises a base structure 10 having a longitudinal axis 12 and being of heavy, strong construction capable of carrying 5 to 30 or more tons of load 13 and transporting the same over difficult roadways, wherein girder means 14 are provided on the dolly and are adapted to be connected to supporting beam means 16 of said load, a plurality of axle structures generally designated 51 and more specifically 18,20,22,24 are pivotally mounted on said base structure 10 on a lateral axis 26 normal to said longitudinal axis 12, wherein at least one pair of said axle structures lies on one side of said axis 12 and at least another pair of said axle structures lies on the other side of said axis 12, wherein each said pair provides an inboard axle structure and an outboard axle structure, outboard wheels mounted on each said outboard axle structure and each being laterally spaced from said longitudinal axis 12 a distance of from about three to about six feet, inboard wheels mounted on each said inboard axle structure and each being laterally spaced from said longitudinal axis a distance of from about six inches to about three feet, whereby when a narrow roadway is encountered the operator can position the inboard wheels thereon such that either or both of the outboard wheels may actually be suspended off the sides of the roadway until the roadway regains a normal width, and wherein a steering mechanism is mounted on said base means and is connected to said axle structures for synchronously pivoting all said wheels thru a steering angle whereby the dolly and load can be steered straight ahead or in sideways angular directions to avoid obstacles and to allow maneuvering of a long load around corners which are too sharp for conventional transport means.

As shown and described in the aforementioned U.S. Pat. No. 6,129,495 auxiliary wheels such as 97 which are readily placed on and removed from frame means 10 are employed to bring the present dolly to the home and position it thereunder for attachment of the dolly to the home.

This invention has been described in detail with particular reference to preferred embodiments thereof, but it will be understood that variations and modifications will be effected within the spirit and scope of the invention.

I claim:

1. A wheeled dolly structure comprising base means having a longitudinal axis (12) and being of heavy, strong steel construction capable of carrying 5 to 30 or more tons of load and transporting the same over difficult roadways wherein girder means are provided on the dolly and are adapted to be connected to supporting beam means of a load, a at least two pairs of axle means mounted on said base means on a lateral axes (26) oriented normal to said longitudinal axis and lying on opposite lateral sides (15) and (19) of said longitudinal axis, each said pair comprising an outboard axle means and an inboard axle means, outboard wheel means mounted on outboard axle means on opposite sides (15) and (19) of said longitudinal axis (12) and spaced laterally from said longitudinal axis a distance of from three to six feet, inboard wheel means mounted on inboard axle means on said opposite sides (15) and (19) and laterally spaced from said longitudinal axis (12) a distance of from six inches to three feet, whereby when a narrow roadway is encountered the operator can position the inboard wheel means thereon such that either or both of the outboard wheel means may actually be suspended off the sides of the roadway until the roadway regains a normal width, and wherein a steering mechanism is mounted on said base means for synchronously pivoting all said wheel means thru a steering angle whereby the dolly structure and load can be steered straight ahead or in sideways angular directions to avoid obstacles and to allow maneuvering of a long load around corners which are too sharp for negotiation by conventional transport means.

2. The dolly structure of claim 1 wherein said outboard wheel means are spaced from each other on said lateral axis a distance of from about nine feet to twelve feet, and wherein said inboard wheel means are spaced from each other on said lateral axis on opposite sides of said longitudinal axis a distance of two to three feet.

3. The dolly structure of claim 1 wherein each wheel means comprises single or dual wheels mounted on the same axle.

4. The combination of the dolly structure of claim 1 mounted on and affixed to supporting beam means of a manufactured home.

5. The dolly structure of claim 1 wherein each said axle means comprises a generally laterally projecting segment (11) of said frame, a generally U shaped steering knuckle (40) having bearing arms (47) and (49) projecting laterally from a body section (53) of said knuckle (40) and forming a gap (55) in which said segment nests, a pivot pin means (42) inserted thru said bearing arms (47) and (49) and said segment (42) to provide a pivot mechanism for a wheel, and an axle shaft (38) affixed to said body section (53) and extending generally laterally for providing a rotative mounting for a wheel.

6. The dolly structure of claim 5 wherein each said outboard wheel means and an adjacent inboard wheel means comprises a wheel pair, and wherein said steering mechanism comprises pivot arm means (43) affixed to each said knuckle (40) and extending generally longitudinally of said dolly structure and having a tie rod end (57) and a power end (59), power bar means (61) pivotally connecting the power ends (59) of adjacent pivot arm means (43), power means pivotally connected between said bar means (61) and said base means and adapted to pivot, in tandem, the wheels of said pairs, and gang tie rod means (41) pivotally connected to each tie rod end (57) of each pivot arm means (43) whereby a highly stable wheel pivot structure for all wheels is provided.

7. The dolly structure of claim 6 wherein said power means comprises a hydraulic cylinder and piston affixed to and between each said power bar means (61) and said base means (10).

8. The dolly structure of claim 7 wherein said power means and gang tie rod means (41) are mounted on opposite sides of said lateral axis (26).

9. The dolly structure of claim 8 wherein the cylinders and pistons are angled laterally outwardly from said longitudinal axis (12) at an angle of from about 300 to about 60° to said longitudinal axis (12).

10. A wheeled dolly structure comprising a base means having a longitudinal axis and being of heavy, strong construction capable of carrying 5 to 30 or more tons of load and transporting the same over difficult roadways, wherein girder means are provided on the dolly and are adapted to be connected to supporting beam means of said load, two pairs of axle means are pivotally mounted on said base means on a lateral axis oriented normal to said longitudinal axis, wherein one said pair lies on one side of said longitudinal axis and the other said pair lies on the other side of said longitudinal axis, wherein each said pair provides an inboard axle means and an outboard axle means, outboard wheel means mounted on each said outboard axle means and being laterally spaced from said longitudinal axis (12) a distance of from three to six feet, inboard wheel means mounted on each said inboard axle means and being laterally spaced from said longitudinal axis a distance of from six inches to three feet, whereby when a narrow roadway is encountered the operator can position the inboard wheel means thereon such that either or both of the outboard wheel means may actually be suspended off the sides of the roadway until the roadway regains a normal width, and wherein a steering mechanism is mounted on said base means and is connected to said axle means for synchronously pivoting all said wheel means thru a steering angle whereby the dolly and load can be steered straight ahead or in sideways angular directions to avoid obstacles and to allow maneuvering of a long load around corners which are too sharp for conventional transport means.

* * * * *